US009855835B1

(12) United States Patent
Sneddon (10) Patent No.: US 9,855,835 B1
(45) Date of Patent: Jan. 2, 2018

(54) PNEUMATIC-BASED DRIVE POWER FOR MOTORIZED VEHICLES

(75) Inventor: Keith C. Sneddon, Sayville, NY (US)

(73) Assignee: Harris Corporation, Melbourne, FL (US)

( * ) Notice: Subject to any disclaimer, the term of this patent is extended or adjusted under 35 U.S.C. 154(b) by 78 days.

(21) Appl. No.: 13/043,091

(22) Filed: Mar. 8, 2011

(51) Int. Cl.
*B60K 6/12* (2006.01)
*B60K 8/00* (2006.01)
*B60K 25/02* (2006.01)

(52) U.S. Cl.
CPC .......... *B60K 8/00* (2013.01); *B60K 6/12* (2013.01); *B60K 2006/123* (2013.01); *B60K 2025/028* (2013.01)

(58) Field of Classification Search
CPC .......... B60K 8/00; B60K 2025/028; B60K 2006/123; B60K 6/12
USPC .... 180/165, 242, 302, 305, 307, 367, 65.31, 180/65.275
See application file for complete search history.

(56) References Cited

U.S. PATENT DOCUMENTS

| | | | | | |
|---|---|---|---|---|---|
| 2,544,606 | A | * | 3/1951 | Mallory | B60K 6/12 180/302 |
| 3,379,008 | A | * | 4/1968 | Manganaro | 180/302 |
| 3,513,929 | A | * | 5/1970 | Kim | 180/302 |
| 3,612,202 | A | * | 10/1971 | Moon et al. | 180/14.3 |
| 3,704,760 | A | * | 12/1972 | Maruyama | 180/65.31 |
| 3,826,096 | A | * | 7/1974 | Hrusch | F02C 6/06 60/656 |
| 3,986,575 | A | * | 10/1976 | Eggmann | 180/302 |
| 4,123,910 | A | * | 11/1978 | Ellison, Sr. | 60/698 |
| 4,132,283 | A | * | 1/1979 | McCurry | 180/165 |
| 4,230,075 | A | * | 10/1980 | Lowther | 123/68 |
| 4,355,508 | A | * | 10/1982 | Blenke et al. | 60/416 |
| 4,798,053 | A | * | 1/1989 | Chang | 60/712 |
| 5,460,239 | A | * | 10/1995 | Jensen | 180/302 |
| 5,549,174 | A | * | 8/1996 | Reis | 180/165 |
| 5,724,811 | A | * | 3/1998 | Gibby | 60/409 |
| 5,847,470 | A | * | 12/1998 | Mitchell | 290/45 |
| 5,853,229 | A | * | 12/1998 | Willmann et al. | 303/3 |
| 5,984,432 | A | * | 11/1999 | Otomo et al. | 303/119.2 |
| 6,044,924 | A | * | 4/2000 | Adli | 180/302 |
| 6,170,587 | B1 | * | 1/2001 | Bullock | 180/69.6 |
| 6,311,797 | B1 | * | 11/2001 | Hubbard | 180/165 |
| 6,353,786 | B1 | * | 3/2002 | Yamada et al. | 701/70 |
| 6,508,324 | B1 | * | 1/2003 | Conley, Jr. | 180/165 |

(Continued)

OTHER PUBLICATIONS

TARDEC Quarterly, "Partnering with Industry and Academia", Warren, MI, Oct.-Dec. 2008, (40 pages).

*Primary Examiner* — James A Shriver, II
*Assistant Examiner* — Vaughn Coolman
(74) *Attorney, Agent, or Firm* — Edell, Shapiro & Finnan, LLC (57) ABSTRACT

A pneumatic drive system for a motorized vehicle includes an air compressor that is operable to couple with a main drive shaft of the motorized vehicle so as to activate the air compressor and generate pressurized air during a braking operation of the motorized vehicle, an accumulator that is operable to receive and store pressurized air from the air compressor during the braking operation, and a pneumatic motor that receives the pressurized air from the accumulator to activate the pneumatic motor. During activation, the pneumatic motor provides energy to the main drive shaft during an acceleration operation of the motorized vehicle.

18 Claims, 4 Drawing Sheets

(56) References Cited

U.S. PATENT DOCUMENTS

| | | | |
|---|---|---|---|
| 7,147,078 B2* | 12/2006 | Teslak et al. | 180/305 |
| 7,461,626 B2* | 12/2008 | Kimes | 123/245 |
| 8,013,567 B2* | 9/2011 | Windsor | H01M 2/1072 |
| | | | 320/101 |
| 8,540,180 B2* | 9/2013 | Sobas | E01C 19/522 |
| | | | 242/403 |
| 8,862,356 B2* | 10/2014 | Miller | B60L 7/24 |
| | | | 180/282 |
| 2006/0000659 A1* | 1/2006 | Teslak et al. | 180/307 |
| 2006/0225941 A1* | 10/2006 | Cole | 180/302 |
| 2007/0163819 A1* | 7/2007 | Richter et al. | 180/65.2 |
| 2008/0251302 A1* | 10/2008 | Lynn et al. | 180/65.2 |
| 2008/0297103 A1* | 12/2008 | Windsor | H01M 2/1072 |
| | | | 320/101 |
| 2009/0301796 A1* | 12/2009 | Wedderburn et al. | 180/2.2 |
| 2010/0151989 A1* | 6/2010 | Read | 477/4 |
| 2010/0270097 A1* | 10/2010 | Prakash et al. | 180/165 |
| 2011/0011663 A1* | 1/2011 | Hebrard | 180/165 |
| 2011/0049909 A1* | 3/2011 | Domes | 290/1 R |
| 2011/0062276 A1* | 3/2011 | Sobas | E01C 19/522 |
| | | | 242/557 |
| 2011/0156402 A1* | 6/2011 | Khymych | 290/55 |
| 2012/0325573 A1* | 12/2012 | Miller | B60L 7/24 |
| | | | 180/282 |

* cited by examiner

PNEUMATIC-BASED DRIVE POWER FOR MOTORIZED VEHICLES

BACKGROUND

In recent years, hybrid electric vehicles have achieved commercial success in consumer automotive markets. This type of vehicle can improve overall energy efficiency by recapturing energy used by the vehicle's braking system, which is typically released to the environment as wasted energy for conventional (i.e., non-hybrid) vehicles. The captured energy is stored as electrical energy in batteries, which can be released to the drive system at appropriate times to reduce the load on the internal combustion engine of the vehicle. Certain types of hybrid electric vehicles can achieve economy improvements of 30% or more.

While hybrid electric vehicles have gained popularity for consumer vehicles (e.g., sedans, minivans, SUVs, etc.), such vehicles are limited in their ability to provide desirable fuel economies for larger and heavier vehicles, such as military vehicles and large package transport vehicles. The high life-cycle cost associated with required battery replacements (and the resulting carbon footprint associated with disposing or recycling used batteries) as well as the larger and heavier battery that is required for larger and heavier vehicles makes a hybrid electric system undesirable for such vehicles. In addition, the limits in power delivery of battery systems also render the hybrid electric technology undesirable for use with vehicles that are larger and heavier in relation to typical consumer vehicles.

Hybrid hydraulic vehicles have also been utilized for motorized vehicles, in which a compressed gas is used to pump hydraulic fluid into a hydraulic motor to provide assistance to the combustion engine of the vehicle. However, there are environmental concerns with such systems, such as hydraulic fluid leakage as well as economic costs associated with the additional weight and maintenance associated with such systems.

SUMMARY

In accordance with an example embodiment of the present invention, a pneumatic drive system for a motorized vehicle is provided, where the motorized vehicle includes a main drive shaft that propels the vehicle. The system comprises an air compressor that is operable to couple with the main drive shaft so as to activate the air compressor and generate pressurized air during a braking operation of the motorized vehicle, an accumulator that is operable to receive and store pressurized air from the air compressor during the braking operation, and a pneumatic motor that receives the pressurized air from the accumulator to activate the pneumatic motor. During activation, the pneumatic motor provides energy to the main drive shaft during an acceleration operation of the motorized vehicle.

In accordance with another example embodiment of the invention, a method of operating a motorized vehicle with a pneumatic drive system is provided, where the motorized vehicle includes a main drive shaft that propels the vehicle. The method comprises coupling an air compressor with the main drive shaft during a braking operation of the motorized vehicle, where the coupling of the air compressor with the main drive shaft activates the air compressor to generate pressurized air, receiving and storing pressurized air from the air compressor within an accumulator, and providing the pressurized air from the accumulator to activate a pneumatic motor during an acceleration operation of the motorized vehicle, where activation of the pneumatic motor provides energy to the main drive shaft.

The above and still further features and advantages of the present invention will become apparent upon consideration of the following detailed description of a specific embodiment thereof, particularly when taken in conjunction with the accompanying drawings wherein like reference numerals in the various figures are utilized to designate like components.

DETAILED DESCRIPTION

A hybrid pneumatic drive system for a motorized vehicle comprises an air compressor to draw air from the environment and direct pressurized air to an accumulator during a braking operation of the vehicle, where the pressurized air is stored at a suitable elevated pressure (i.e., a pressure that is above the ambient air pressure or air pressure of the surrounding environment) until it is used. The accumulator directs the pressurized air to a pneumatic motor, where it is used as a working fluid for driving the pneumatic motor. The pneumatic motor is coupled with a drive shaft of the motorized vehicle to facilitate rotation of the drive shaft to propel the motorized vehicle. A main drive engine is also coupled to the drive shaft, and the pneumatic motor is operable in combination with the main drive engine to reduce the energy requirements of the main drive engine during acceleration of the motorized vehicle.

The hybrid pneumatic drive system can be utilized with any types, makes and models of motorized vehicles including, without limitation, conventional automobiles (e.g., sedans, SUVs, pick-up trucks, etc.), as well as larger types of vehicles (e.g., military, shipping and other types of industrial vehicles). The motorized vehicles include a main drive system (e.g., an internal combustion engine) to power, accelerate and propel the vehicle as well as a braking system to decelerate or stop the vehicle. The motorized vehicles are typically types having at least four wheels with at least one front axle and at least one rear axle. However, it is noted that the present invention is not limited to such types of vehicles, but instead can be implemented for use with any type of vehicle (e.g., a two or three wheeled vehicle) that includes a main drive system as well as a suitable braking system. It is noted that drive systems (such as internal combustion engines, electric motors, etc.) and braking systems (e.g., disk braking systems or any other suitable types of braking systems) are well known in the art of motorized vehicles, and the present invention can be implemented with any such conventional types and/or other types of systems.

Figure 1:
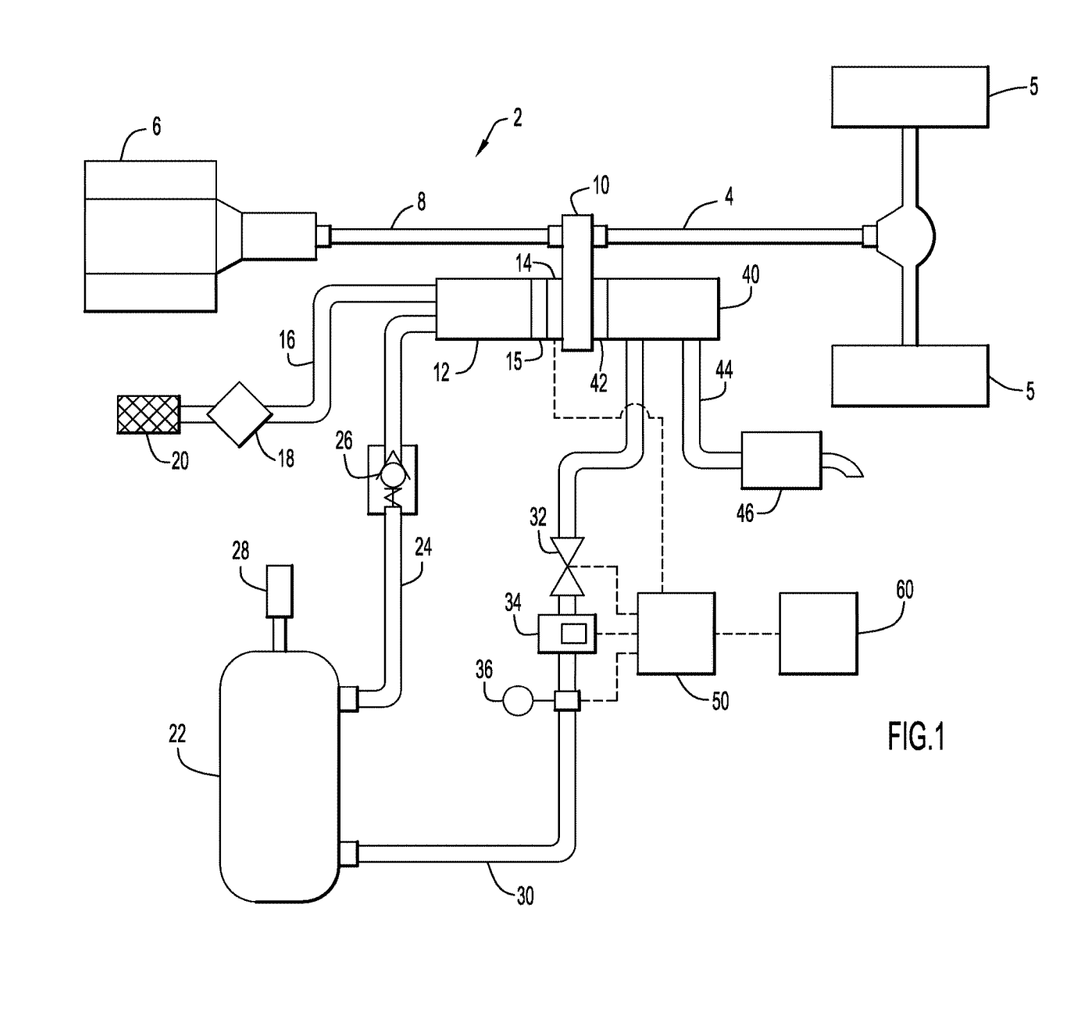
FIG. 1 is a schematic representation of an example embodiment of a hybrid pneumatic drive system for use with a motorized vehicle in accordance with the invention.

An example embodiment of a hybrid pneumatic drive system and operation of the system is now described with reference to the figures. Referring to FIG. 1, a hybrid pneumatic drive system 2 is shown connected, via a main drive shaft 4, to a pair of wheels 5 of a motorized vehicle, where rotation of the main drive shaft 4 provides power and rotational energy to the wheels to propel the vehicle. As previously noted, the motorized vehicle can be of any suitable make, model or type, where the motorized vehicle can be propelled utilizing any suitable number of wheels and/or any suitable number of power drive mechanisms that transfer drive power from the main drive shaft to one or more wheels or pairs of wheels. Thus, while the main drive shaft 4 shown in FIG. 1 is shown as providing power to one pair of wheels 5 (e.g., front wheels or rear wheels of the vehicle), it is noted that the system can also be designed to provide drive power to front and/or rear wheels of the vehicle (e.g., front wheel drive, rear wheel drive, all wheel drive, etc.) For ease of reference, only the drive system 2 and a pair of drive wheels 5 are schematically shown for the motorized vehicle in FIG. 1. However, it should be understood that the system is connected to a lower carriage portion or chassis of the motorized vehicle. It is further noted that the drive system 2 can be connected to the vehicle chassis in a similar manner as a conventional or other type of drive system for a motorized vehicle (e.g., via suitable mounts for components to the chassis). It is further noted that the motorized vehicle includes a main braking system (e.g., disk brakes) that are implemented on any selected number of wheels (e.g., one, two or more) of the motorized vehicle to decelerate or stop the vehicle. The main braking system is not shown in FIG. 1 for ease of reference. An example embodiment of a motorized vehicle with which the drive system 2 can be implemented is the vehicle shown in FIG. 4.

A main drive engine 6 is connected via a drive shaft 8 and transfer case 10 to the main drive shaft 4. The main drive engine 6 can be an internal combustion engine of any conventional or other suitable type that utilizes a fossil fuel source (e.g., gasoline, diesel fuel, propane, etc.) to power the engine, where the engine works in any conventional or other suitable manner to rotate the drive shaft 8. Alternatively, the main drive engine can be of any other suitable type (e.g., an electric powered engine) that provides drive power to the main drive shaft 4. The drive shaft 8 from the main drive engine 6 is coupled to the main drive shaft 4 within the transfer case 10, such that rotational energy of the drive shaft 8 is conveyed to the main drive shaft 4 during operation of the main drive engine 6. The transfer case 10 includes any suitable number of gears, rotary shafts, etc. that facilitate transfer of rotational and kinetic energy from one rotating shaft or drive member to another, particularly when the shafts/drive members are not aligned coaxially or even in parallel with one another.

The pneumatic drive portion of system 2 includes an air compressor 12 that is coupled with the main drive shaft 4 via the transfer case 10, an electromechanical clutch 14, and a continuously variable transmission (CVT) 15. In particular, the clutch 14, via an electrical actuating mechanism (e.g., a solenoid), is provided to selectively engage and disengage a drive shaft of the compressor connected with the CVT 15 with the main drive shaft 4 within the transfer case 10. When engaged with the main drive shaft 4, the CVT 15 converts the power of the main drive shaft 4 to an appropriate drive power for the air compressor 12 (e.g., via suitable gearing mechanisms within the CVT). This facilitates operation of the compressor 12 to draw air in from the external environment surrounding the motorized vehicle and compress/pressurize the air to a selected pressure. Air is drawn into the compressor 12 via an air intake conduit 16. An intake screen 20 is disposed at the inlet end of the air intake conduit 16, and an air filter 18 is disposed within the conduit 16 at a location downstream from the intake screen 20. Both the intake screen 20 and air filter 18 provide a suitable filtration of the intake air (e.g., removing particulate matter of selected dimensions from the air) prior to the intake air entering the compressor 12.

The pneumatic drive portion further includes an accumulator 22 comprising a high pressure tank that receives pressurized air from the compressor 12, via a pressurized air conduit 24. A check valve 26 is provided within the air conduit 24 to prevent any backflow of air from the air conduit back to the compressor 12. In addition, a pressure regulator can be provided within the air conduit 24 to control the pressure and flow of air prior to entry within the accumulator. The accumulator 22 also includes a relief valve 28 that controls the pressure within the accumulator (e.g., by releasing pressurized air from the accumulator to the external environment when the pressure within the accumulator exceeds an upper limit value).

Although the accumulator 22 is depicted in FIG. 1 as a single tank, it is noted that the accumulator can alternatively comprise a plurality of tanks arranged in parallel or in series within the pneumatic drive portion of the system 2. The accumulator is designed to accommodate and store the pressurized air received from the air compressor. As used herein, the term "pressurized air" refers to air that is at a pressure which is greater than the pressure of air in the ambient or surrounding environment for the motorized vehicle. In particular, the accumulator can store pressurized air at pressures of at least about 500 psig (about 3.447 MPa) or greater for use in operation of the pneumatic drive portion of the system 2. For example, during system operation, the compressor can provide pressurized air to the accumulator, with the accumulator storing pressurized air at pressures as large as about 6,000 psig (about 41.37 MPa) to about 8,000 psig (about 55.16 MPa) or even greater.

Another pressurized air conduit 30 connects an outlet of the accumulator 22 with an inlet of a pneumatic motor 40. Disposed within the air conduit 30 is an electromechanical valve 32 that is electrically controlled (e.g., via a solenoid actuator) to control the flow of pressurized air from the accumulator 22 to the pneumatic motor 40. A pressure regulator 34 is also provided within the air conduit 30 to control the pressure and flow of pressurized air to the pneumatic motor 40.

The pneumatic motor 40 receives the pressurized air from the accumulator and allows the air to expand to generate mechanical energy, which rotates an output shaft of the motor 40. The output shaft of the pneumatic motor 40 is coupled, via a one-way or sprag clutch 42, to a suitable connection within the transfer case 10 that is also coupled with the main drive shaft 4. The sprag clutch 42 frictionally engages with the connection within the transfer case 10 when the output shaft of the motor 40 rotates in one direction, and the sprag clutch disengages or free wheels with the connection in the transfer case when the output shaft of the motor 40 is stationary. Thus, the pneumatic motor 40 delivers rotary drive power to the main drive shaft 4 by expansion of pressurized air received from the accumulator 22. The expanded air exits the motor 40 via an exhaust conduit 44 and muffler 46.

An electronic control unit (ECU) or controller 50 is provided to control operation of the pneumatic drive portion of the system 2 by controlling the electromechanical clutch 14 (which couples the compressor 12 to the main drive shaft 4) and the electromechanical valve 32 (which provides pressurized air flow from the accumulator 22 to the inlet of the pneumatic motor 40). The controller 50 is coupled with the clutch 14 and the valve 32, as well as one or more sensors provided within the accumulator 22 and/or at other locations within the pneumatic drive portion. In particular, one or more pressure sensors as well as any other types of sensors (e.g., temperature sensors) are provided to measure the pressure and/or amount of pressurized air that is stored within the accumulator 22 and/or flowing through the air conduit 30 at any given time. As shown in FIG. 1, a pressure sensor 36 is provided in the air conduit 30 proximate the outlet of the accumulator 22. However, the system 2 can include any other pressure and/or other types of sensors at other locations (e.g., to measure pressure and/or temperature within the accumulator). The controller 50 is also coupled with the pressure regulator 34 so as to control operation of the regulator in order to further control the pressure and flow of air to the pneumatic motor 40.

The controller 50 is coupled with the sensor(s) (represented by sensor 36), regulator 34, clutch 12 and valve 32 via any suitable wireless or hardwire connection. In addition, the controller 50 is coupled (via a wireless or hardwire connection) with the accelerator and brake pedals of the motorized vehicle (represented generally as box 60 in FIG. 1). One or more suitable position and/or any other types of displacement sensors are connected with the accelerator and brake pedals and coupled with the controller 50 to provide the controller with an indication of the amount of braking force or the acceleration force required during operation (e.g., the braking or acceleration force can be determined as proportionate to the amount or degree of displacement of the brake or acceleration pedal that is pressed by the user or operator of the motorized vehicle).

The controller includes a processor with suitable logic that facilitates control of the hybrid pneumatic system 2 based upon the braking and power requirements of the motorized vehicle during operation. The controller can also include a memory module to store data acquired from the sensors and/or any other types of information, including control algorithms to be implemented by the processor during vehicle operation.

The braking and acceleration operations for the hybrid pneumatic drive system are now described with reference to the example process flow charts depicted in FIGS. 2 and 3. At the start of operation of the motorized vehicle, the accumulator 22 may be empty or filled to some level (e.g., partially filled or filled to capacity) with pressurized air (e.g., the accumulator may contain some amount of pressurized air that was accumulated during a previous use of the vehicle). System operation is initiated when a user starts an ignition for the motorized vehicle to initiate operation of the internal combustion engine 6. The user proceeds to travel at a selected velocity. When the user decides to initiate braking of the motorized vehicle, the controller 50 of the system 2 determines whether to "charge" the accumulator 22 with pressurized air.

Figure 2:
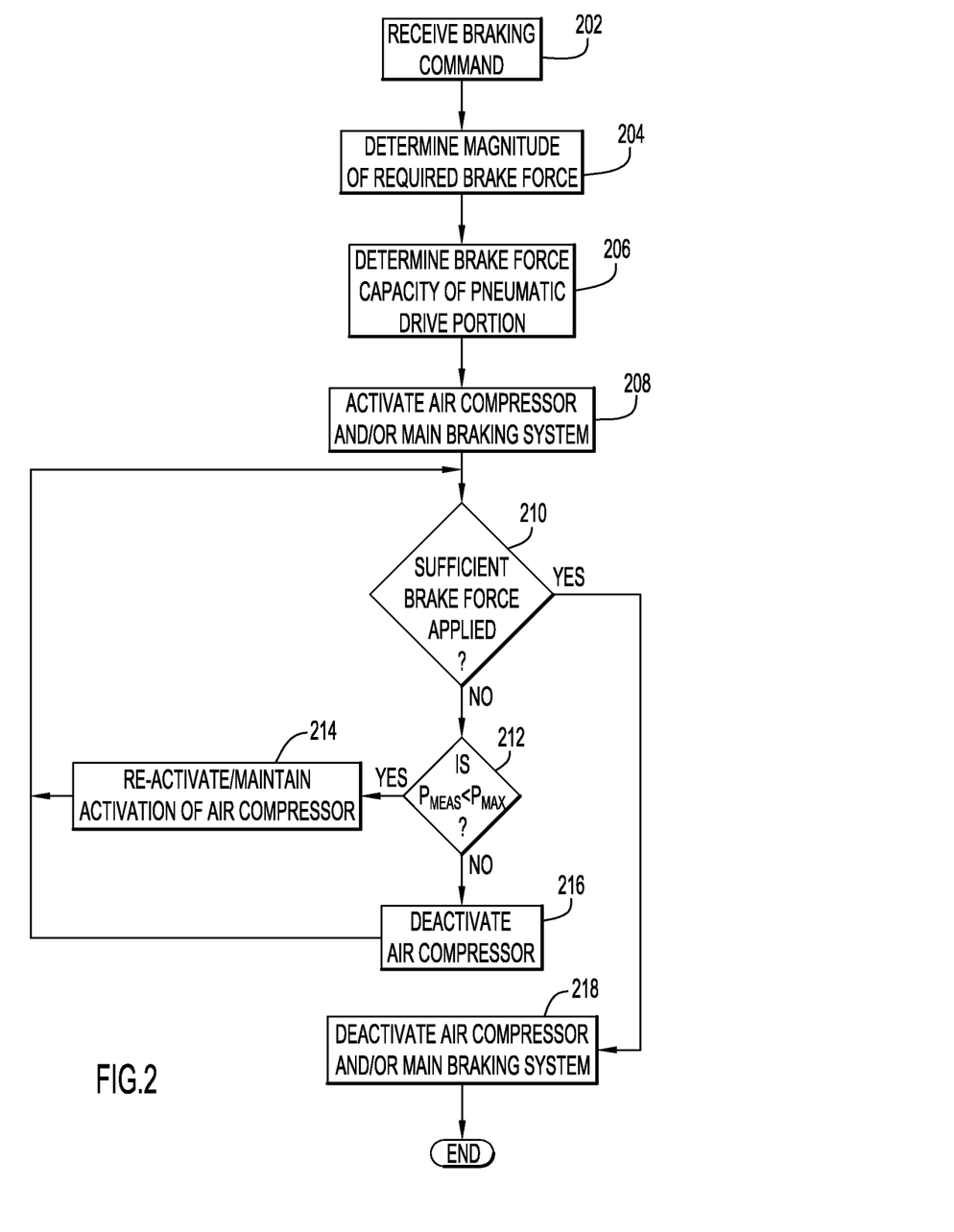
FIG. 2 is flow chart of a method of utilizing the hybrid pneumatic drive system of FIG. 1 during a braking operation of a motorized vehicle in accordance with an example embodiment of the invention.
Figure 3:
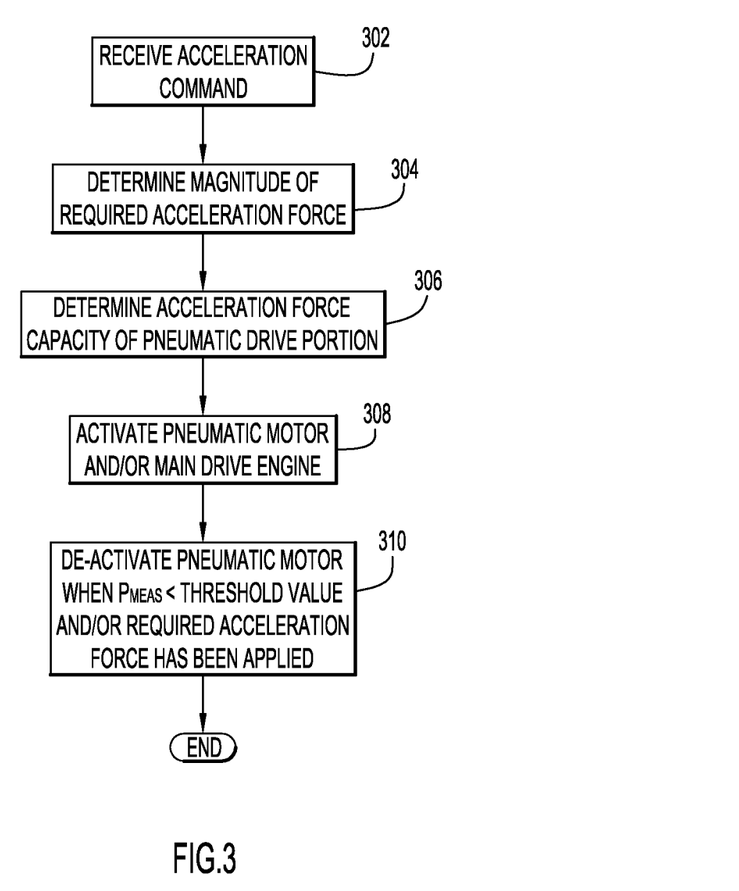
FIG. 3 is flow chart of a method of utilizing the hybrid pneumatic drive system during an acceleration operation of a motorized vehicle in accordance with an example embodiment of the invention.

FIG. 2 describes the braking process of the system 2. A braking command is initiated by the user by pressing the brake pedal of the motorized vehicle (shown generally as box 60 in FIG. 1). The controller 50, which is coupled with the brake pedal position/displacement sensors, receives the braking command (step 202) and determines the magnitude of the brake force required based upon the amount or degree of displacement of the brake pedal by the user (step 204).

The controller 50 next determines the brake force capacity that can be provided by the pneumatic portion of the system 2 (step 206). In particular, when the compressor 12 is activated, by coupling the electromechanical clutch 12 with the main drive shaft 4 via the transfer case 10, at least some of the rotational power of the main drive shaft is transferred as kinetic energy, through the transfer case, clutch and CVT, to operate the compressor. This transfer of kinetic energy results in a "drag" on the main drive shaft 4 that reduces the speed or velocity of the motorized vehicle. The controller 50 determines, based upon the amount of pressurized air that is already in the accumulator 22 (e.g., by measuring the pressure and/or any other conditions within the accumulator and/or the conduit 30 via the sensors disposed at such locations) and thus to what extent the compressor needs to operate, the magnitude of the brake force capacity (e.g., the amount of "drag" that can be applied to the drive shaft) that results from operation of the compressor. The remaining or excess braking force that is required to achieve the required braking force is provided by the main braking system (e.g., a disk brake system) for the motorized vehicle. Control of the amount of force applied by the main braking system can be achieved in any number of conventional or other ways (e.g., for a hydraulic braking system, by controlling the pressure of the hydraulic portion that applies a force to the mechanical/frictional portion of the braking system).

In an example embodiment, the control logic of the controller 50 may allow operation of the compressor only to the extent that a maximum pressure ($P_{max}$) is achieved within the accumulator 22. Operation of the compressor 12 is initiated and maintained during a braking cycle of operation of the motorized vehicle (i.e., based upon a brake command by the user pressing on the brake pedal of the vehicle) only to the extent that the measured pressure within the accumulator 22 is no greater than the maximum pressure ($P_{meas} \leq P_{max}$). In another example embodiment, the controller 50 may continuously operate the compressor 12 to supply pressurized air to the accumulator 22 during the braking operation. However, the pressure within the accumulator 22 can be controlled so as to not exceed the maximum pressure ($P_{max}$) by bleeding air from the accumulator (e.g., via the relieve valve 28) or from the air conduit 30 (e.g., via an electromechanical valve disposed along the air conduit 30 that can be selectively controlled by the controller 50 to bleed air from the pneumatic drive portion when the pressure approaches $P_{max}$).

After determining the brake force capacity of the pneumatic drive portion, the controller 50 initiates a braking operation for the motorized vehicle by activating the air compressor 12 (step 208). In particular, the controller 50 activates the clutch 14 so as to couple the drive shaft of the compressor 12, via the CVT 15, clutch 14 and transfer case 10, with the main drive shaft. The main braking system is also actuated, as necessary (e.g., when it is determined that the required braking force exceeds the braking capacity of the pneumatic drive portion of the system 2). The kinetic energy from the rotation of the main drive shaft 4 is transferred from the transfer case 10 and via the clutch 14 and CVT 15 to the drive shaft of the compressor 12. This results in pressurized air being supplied to the accumulator and also a deceleration or reduction in velocity of the motorized vehicle.

The controller 50 determines whether a sufficient brake force has been applied as a result of actuation of the compressor 12 and/or the main braking system of the vehicle (step 210). If the required brake force has been fully applied, the compressor (if still operating) is deactivated (step 218)

along with the main braking system, as necessary, and the braking operation ends. The air compressor 12 is deactivated by decoupling the clutch 14 with the main drive shaft 4.

If the required braking force has not yet been fully applied, the controller 50 monitors the pressure within the accumulator 22 (step 212). If the pressure within the accumulator is less than the maximum allowed pressure ($P_{meas} < P_{max}$), the controller 50 re-activates or maintains activation of the compressor 12 (step 214), and the control logic proceeds back to step 210. If the measured pressure within the accumulator is not less than the maximum allowed pressure, the air compressor is deactivated (step 216), and the control logic proceeds back to step 210. In an alternative embodiment, as noted above, the air compressor can continue to operate during the entire braking operation, where the controller monitors the pressure within the accumulator and bleeds the accumulator as necessary (e.g., when $P_{meas}$ approaches $P_{max}$).

Thus, during the braking operation, the energy that would otherwise be lost from the main drive shaft 4 of the motorized vehicle is recaptured to some extent by the pneumatic drive portion of the system 2, which pressurizes air and stores the pressurized air within the accumulator 22 for use during an acceleration operation.

The acceleration operation of the drive system 2 to propel the motorized vehicle from a stopped or zero velocity state to an accelerated/moving state is now described with reference to FIG. 3. When the user of the motorized vehicle initiates an acceleration command by pressing upon the accelerator pedal (indicated generally as box 60 in FIG. 1), the displacement sensor(s) associated with the accelerator pedal provide the command to the controller 50 (step 302), where the degree of acceleration to be applied by the drive system 2 is determined by the controller 50 based upon the sensor measurements. The controller 50 determines the magnitude of the acceleration force required (step 304) based upon the displacement sensor information and also the capacity of the acceleration force that can be provided by the pneumatic drive portion of the system 2 (step 306) based upon the known amount of pressurized air within the accumulator 22 (e.g., based upon pressure measurements and any other types of sensor measurements, such as temperature measurements, measured within the accumulator 22 and/or within the air conduit 30). The controller 50 activates at least one of the pneumatic motor 40 and the main drive engine 6 based upon the acceleration force requirements (step 308). For example, if it is determined that the pneumatic motor 40 can contribute to the acceleration requirements based upon the amount of pressurized air within the accumulator 22, then the pneumatic motor is activated with the main drive engine. However, if it is determined that there is an insufficient amount of pressurized air necessary to operate the pneumatic motor 40 to meet the acceleration requirements, only the main drive engine 6 is activated to meet the acceleration requirements.

The controller activates the pneumatic motor 40 (step 304) by opening the electromechanical valve 32 to force pressurized air from the accumulator 22 through the air conduit 30 and to the inlet of the pneumatic motor 40. The pressure of the air is also regulated by the regulator 34, which is selectively controlled by the controller 50. The pressurized air flows through the air conduit 30 to the inlet of the pneumatic motor 40, where it expands within the motor and causes the drive shaft of the motor to rotate. The one way or sprag clutch 42 connected with the rotating drive shaft of the pneumatic motor 40 couples, via the transfer case 10, with the main drive shaft 4, delivering accelerating power to the vehicle. The expanded air exits the pneumatic motor 40 through the exhaust conduit 44 and muffler 46, where it is vented to the environment surrounding the vehicle.

When the pneumatic motor and the main drive engine are both activated, they can operate in parallel to provide power to the main drive shaft of the vehicle. In other words, both the pneumatic motor and main drive engine can operate together, where the pneumatic motor ceases operation when the pressurized air supply from the accumulator is sufficiently depleted. Alternatively, the system can be designed to operate in series, where the pneumatic motor can be activated first and operated until its energy is depleted or exhausted (i.e., the pressurized air is sufficiently depleted within the accumulator), followed by activation of the main drive engine.

The controller 50 deactivates the pneumatic motor (by closing the electromechanical valve 32) when it is determined that the pressurized air supply is sufficiently depleted (e.g., when a measured pressure within the pneumatic drive portion, $P_{meas}$, is below a minimum or threshold value) and/or when the required acceleration force has been applied to the main drive shaft 4 (step 310).

Thus, the system 2 facilitates "charging" of the accumulator 22 with pressurized air during a braking operation of the motorized vehicle, so as to capture some of the braking energy from the main drive shaft 4, with subsequent use of the captured energy during an acceleration operation of the vehicle. A continuous cycle of braking and acceleration operations when utilizing the motorized vehicle results in a reduction of the energy requirements for the main drive engine of the system 2.

Figure 4:
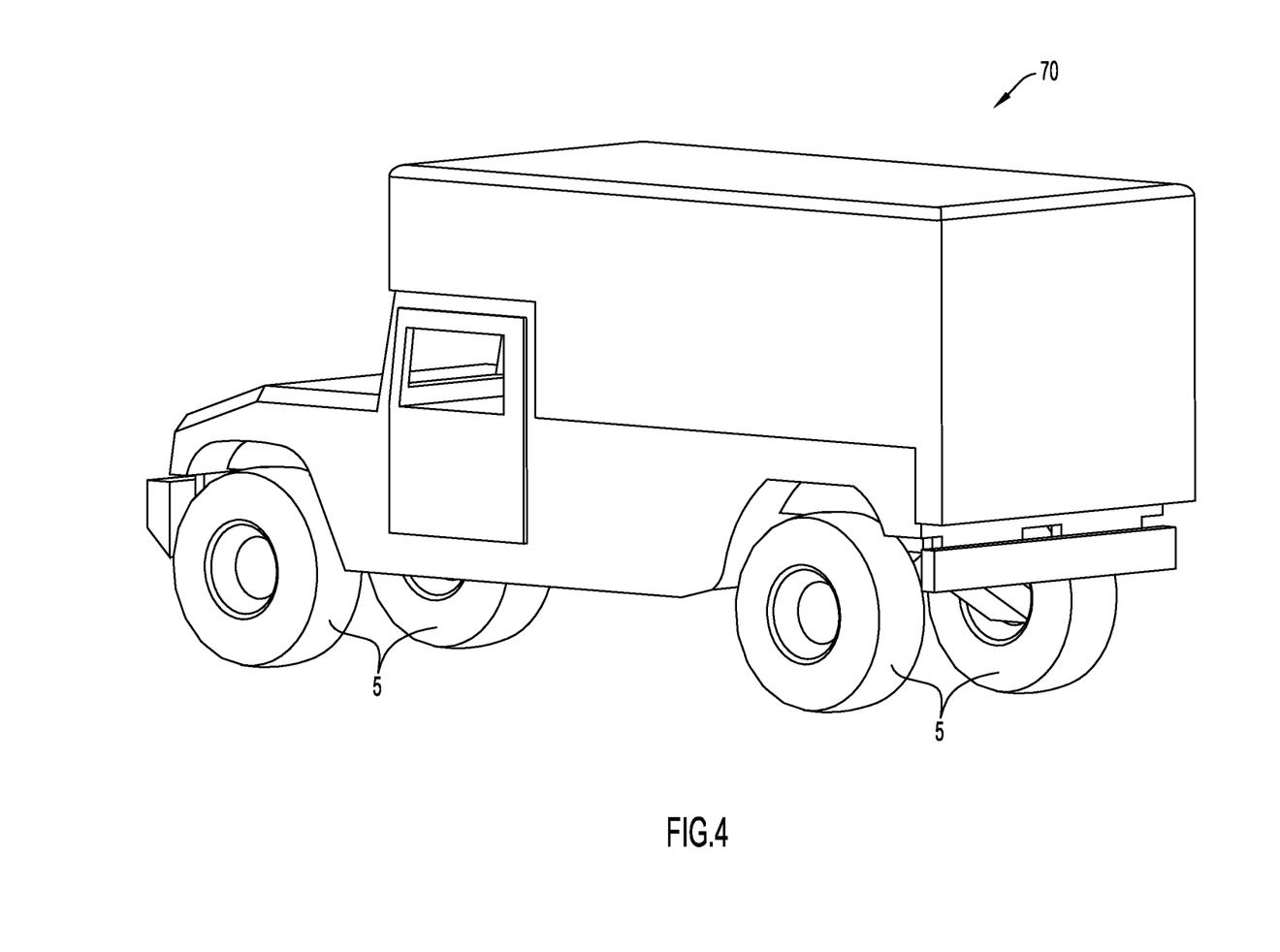
FIG. 4 depicts an example embodiment of a medium to heavy duty motorized vehicle utilizing the hybrid pneumatic drive system of FIG. 1.

As previously noted, the hybrid pneumatic drive systems and corresponding methods described above can be utilized with any types, makes or models of motorized vehicles, including on-road vehicles, off-road vehicles, commercial automobiles typically utilized by private consumers, medium to heavy duty military and/or commercial vehicles including, without limitation, medium duty trucks (e.g., refuse trucks, shipping trucks, etc.), buses (e.g., shuttle buses, public transit buses, etc.), construction equipment (e.g., loader, equipment handlers and transporters, etc.), and vehicles with stationary power take-off (PTO) requirements (e.g., utility boom trucks). An example embodiment of a motorized vehicle in which the hybrid pneumatic system of the present invention can be utilized is depicted in FIG. 4, which shows a military vehicle 70.

The system of the present invention does not require an electric battery or hydraulic fluid, which can significantly increase the weight of the vehicle, particularly for medium to heavy duty vehicles. In addition, the pneumatic drive portion of the system of the present invention is an open system in that the "working fluid" (i.e., air) is obtained (drawn in) from the surrounding environment in which the motorized vehicle is operated and is further exhausted after being used.

Having described example embodiments of a hybrid pneumatic drive system for motorized vehicles and corresponding methods associated with such hybrid pneumatic drive systems, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A pneumatic drive system for a motorized vehicle, the motorized vehicle including a main drive shaft that propels the vehicle and a main drive engine configured to selectively couple with the main drive shaft to provide energy to the main drive shaft, the system comprising:
   an air compressor that is operable to couple with the main drive shaft so as to activate the air compressor and generate pressurized air during a braking operation of the motorized vehicle, wherein the pressurized air is obtained by drawing air from an environment surrounding the motorized vehicle into an inlet of the air compressor, and the air compressor is only operable during the braking operation;
   an accumulator that is operable to receive and store pressurized air from the air compressor during the braking operation;
   a pneumatic motor that receives the pressurized air from the accumulator to activate the pneumatic motor such that, during activation of the pneumatic motor, the pneumatic motor provides energy to the main drive shaft separately and independently from the main drive engine during an acceleration operation of the motorized vehicle, wherein the pressurized air that is received by the pneumatic motor to provide energy to the main drive shaft is exhausted from an outlet of the pneumatic motor to the environment surrounding the motorized vehicle; and
   a controller that selectively couples the air compressor with the main drive shaft during the braking operation and selectively activates the pneumatic motor during the acceleration operation, wherein the controller is configured to determine a magnitude of a braking force corresponding with a braking command input by a user and whether to utilize one or both of the air compressor and a main braking system of the motorized vehicle during the braking operation;
   wherein the accumulator does not provide pressurized air to the main drive engine.

2. The system of claim 1, wherein the main drive engine and the pneumatic motor separately and independently provide energy to the main drive shaft during the acceleration operation.

3. The system of claim 2, wherein the main drive engine comprises an internal combustion engine.

4. The system of claim 1, wherein the controller is configured to deactivate the air compressor during the braking operation when a measured pressure within the accumulator exceeds a maximum value.

5. The system of claim 1, further comprising:
   an electromechanical valve that is controlled by the controller to selectively supply pressurized air from the accumulator to the pneumatic motor during the acceleration operation.

6. The system of claim 1, further comprising:
   a one way clutch that couples the pneumatic motor with the main drive shaft when the pneumatic motor is activated.

7. The system of claim 1, further comprising:
   an electromechanical clutch that is controlled by the controller to reversibly couple the air compressor with the main drive shaft to activate the air compressor during the braking operation.

8. The system of claim 1, wherein the determination by the controller of whether to utilize the air compressor during the braking operation comprises:
   measuring a pressure within the accumulator; and
   enabling operation, via the controller, of the air compressor only when the measured pressure is no greater than a maximum pressure value assigned to the accumulator.

9. A method of operating a motorized vehicle with a pneumatic drive system, the motorized vehicle including a main drive shaft that propels the vehicle and a main braking system and a main drive engine configured to selectively couple with the main drive shaft to provide energy to the main drive shaft, the method comprising:
   coupling an air compressor with the main drive shaft during a braking operation of the motorized vehicle, wherein the coupling of the air compressor with the main drive shaft activates the air compressor to generate pressurized air during a braking operation of the motorized vehicle, the pressurized air is obtained by drawing air from an environment surrounding the motorized vehicle into an inlet of the air compressor, and the air compressor is only operable during the braking operation;
   determining, via a controller that selectively couples the air compressor with the main drive shaft during the braking operation and selectively activates a pneumatic motor during an acceleration operation, a magnitude of a braking force corresponding with a braking command input by a user and whether to utilize one or both of the air compressor and the main braking system of the motorized vehicle during the braking operation;
   receiving and storing pressurized air from the air compressor within an accumulator; and
   providing the pressurized air from the accumulator to activate a pneumatic motor during an acceleration operation of the motorized vehicle, wherein activation of the pneumatic motor provides energy to the main drive shaft separately and independently from the main drive engine, the pressurized air that is received by the pneumatic motor to provide energy to the main drive shaft is exhausted from an outlet of the pneumatic motor to the environment surrounding the motorized vehicle, and the accumulator does not provide pressurized air to the main drive engine.

10. The method of claim 9, further comprising:
    providing energy separately and independently by each of the main drive engine and the pneumatic motor to the main drive shaft during the acceleration operation.

11. The method of claim 10, wherein the main drive engine comprises an internal combustion engine.

12. The method of claim 9, wherein the controller controls an electromechanical clutch to reversibly couple the air compressor with the main drive shaft to activate the air compressor during the braking operation.

13. The method of claim 9, wherein the controller deactivates the air compressor during the braking operation when a measured pressure within the accumulator exceeds a maximum value.

14. The method of claim 9, wherein the controller controls an electromechanical valve to selectively supply pressurized air from the accumulator to the pneumatic motor so as to activate the pneumatic motor during the acceleration operation.

15. The method of claim 9, wherein the pneumatic motor couples with the main drive shaft via a one way clutch.

16. The method of claim 9, wherein the determination by the controller of whether to utilize the air compressor during the braking operation comprises:
 measuring a pressure within the accumulator; and
 enabling operation, via the controller, of the air compressor only when the measured pressure is no greater than a maximum pressure value assigned to the accumulator.

17. A pneumatic drive system for a motorized vehicle, the motorized vehicle including a main drive shaft that propels the vehicle and a main drive engine configured to selectively couple with the main drive shaft to provide energy to the main drive shaft, the system comprising:
 an air compressor that is operable to couple with the main drive shaft so as to activate the air compressor and generate pressurized air during a braking operation of the motorized vehicle, wherein the pressurized air is obtained by drawing air from an environment surrounding the motorized vehicle into an inlet of the air compressor, and the air compressor operates only during the braking operation;
 an accumulator that is operable to receive and store pressurized air from the air compressor during the braking operation; and
 a pneumatic motor that receives the pressurized air from the accumulator to activate the pneumatic motor such that, during activation of the pneumatic motor, the pneumatic motor provides energy to the main drive shaft separately and independently from the main drive engine during an acceleration operation of the motorized vehicle, wherein the pressurized air that is received by the pneumatic motor to provide energy to the main drive shaft is exhausted from an outlet of the pneumatic motor to the environment surrounding the motorized vehicle;
 wherein the accumulator does not provide pressurized air to the main drive engine.

18. The pneumatic drive system of claim 17, further comprising:
 a controller that selectively couples the air compressor with the main drive shaft during the braking operation and selectively activates the pneumatic motor during the acceleration operation, wherein the controller is configured to determine a magnitude of a braking force corresponding with a braking command input by a user and whether to utilize one or both of the air compressor and a main braking system of the motorized vehicle during the braking operation;
 wherein the determination by the controller of whether to utilize the air compressor during the braking operation comprises:
 measuring a pressure within the accumulator; and
 enabling operation, via the controller, of the air compressor only when the measured pressure is no greater than a maximum pressure value assigned to the accumulator.

* * * * *